(12) United States Patent
Tsunoda et al.

(10) Patent No.: US 11,114,249 B2
(45) Date of Patent: Sep. 7, 2021

(54) THIN-FILM CAPACITOR

(71) Applicant: TDK Corporation, Tokyo (JP)

(72) Inventors: Koichi Tsunoda, Tokyo (JP);
Mitsuhiro Tomikawa, Tokyo (JP);
Kazuhiro Yoshikawa, Tokyo (JP);
Kenichi Yoshida, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 16/483,516

(22) PCT Filed: Feb. 13, 2018

(86) PCT No.: PCT/JP2018/004905
§ 371 (c)(1),
(2) Date: Aug. 5, 2019

(87) PCT Pub. No.: WO2018/155257
PCT Pub. Date: Aug. 30, 2018

(65) Prior Publication Data
US 2020/0013554 A1 Jan. 9, 2020

(30) Foreign Application Priority Data

Feb. 21, 2017 (JP) .............................. JP2017-030027

(51) Int. Cl.
*H01G 4/33* (2006.01)
*H01G 4/012* (2006.01)
(Continued)

(52) U.S. Cl.
CPC .............. *H01G 4/33* (2013.01); *H01G 4/012* (2013.01); *H01G 4/252* (2013.01); *H01G 4/306* (2013.01)

(58) Field of Classification Search
CPC .......... H01G 4/33; H01G 4/012; H01G 4/252; H01G 4/306
See application file for complete search history.

(56) References Cited

U.S. PATENT DOCUMENTS 5,323,520 A * 6/1994 Peters .................... H01G 4/232
29/25.42
5,633,181 A 5/1997 Hayashi
(Continued)

FOREIGN PATENT DOCUMENTS

| CN | 1988083 A | 6/2006 |
|---|---|---|
| JP | H08-97310 A | 4/1996 |

(Continued)

OTHER PUBLICATIONS

International Preliminary Report on Patentability dated Sep. 6, 2019 for PCT/JP2018/004905.

*Primary Examiner* — Nathan Milakovich
(74) *Attorney, Agent, or Firm* — Faegre Drinker Biddle & Reath LLP

(57) ABSTRACT

In a thin-film capacitor, an electrode terminal layer and an electrode layer of a capacitor portion are connected to electrode terminals by via conductors that is formed to penetrate an insulating layer in a thickness direction thereof, and a short circuit wiring in the thickness direction is realized by the via conductors. In the thin-film capacitor, an increase in the number of terminals in the plurality of electrode terminals is achieved, a decrease in length of a circuit wiring is achieved, and thus a thin-film capacitor with low-ESL has been achieved.

5 Claims, 4 Drawing Sheets

(51) Int. Cl.
*H01G 4/252* (2006.01)
*H01G 4/30* (2006.01)

(56) References Cited

U.S. PATENT DOCUMENTS

| | | | |
|---|---|---|---|
| 5,822,175 A | 10/1998 | Azuma | |
| 5,929,473 A | 7/1999 | Nishihori et al. | |
| 6,027,947 A | 2/2000 | Evans et al. | |
| 6,225,185 B1 | 5/2001 | Yamazaki et al. | |
| 6,724,611 B1* | 4/2004 | Mosley | H01G 4/228 257/E27.116 |
| 7,046,501 B2* | 5/2006 | Tsuji | H01G 4/232 257/E23.062 |
| 10,340,088 B2* | 7/2019 | Tsunoda | H01G 2/02 |
| 2002/0102768 A1* | 8/2002 | Shioga | H01L 23/5223 438/107 |
| 2002/0122287 A1 | 9/2002 | Mido et al. | |
| 2004/0018693 A1 | 1/2004 | Shioga et al. | |
| 2004/0130849 A1 | 7/2004 | Kurihara et al. | |
| 2005/0146838 A1 | 7/2005 | Shioga et al. | |
| 2005/0156279 A1 | 7/2005 | Shioga et al. | |
| 2006/0245139 A1 | 11/2006 | Kariya | |
| 2006/0250749 A1 | 11/2006 | Kurihara et al. | |
| 2007/0034989 A1 | 2/2007 | Shioga et al. | |
| 2007/0139859 A1 | 6/2007 | Osaka et al. | |
| 2007/0141800 A1* | 6/2007 | Kurihara | H01L 24/16 438/396 |
| 2008/0068780 A1 | 3/2008 | Shioga et al. | |
| 2008/0145996 A1 | 6/2008 | Nomura et al. | |
| 2008/0164563 A1 | 7/2008 | Nomura et al. | |
| 2008/0315358 A1 | 12/2008 | Shioga et al. | |
| 2009/0007405 A1 | 1/2009 | Shioga et al. | |
| 2009/0201624 A1 | 8/2009 | Hattori et al. | |
| 2010/0118468 A1 | 5/2010 | Nomura et al. | |
| 2010/0246089 A1 | 9/2010 | Yano et al. | |
| 2011/0044011 A1 | 2/2011 | Ohtsuka et al. | |
| 2011/0075319 A1 | 3/2011 | Oikawa et al. | |
| 2011/0110016 A1 | 5/2011 | Takeshima et al. | |
| 2011/0128669 A1 | 6/2011 | Yano et al. | |
| 2012/0104545 A1 | 5/2012 | Takeshima et al. | |
| 2016/0027579 A1 | 1/2016 | Kurachi et al. | |
| 2016/0064473 A1 | 3/2016 | Morito et al. | |
| 2019/0279823 A1* | 9/2019 | Kumagae | H01G 4/306 |
| 2019/0287726 A1* | 9/2019 | Yoshikawa | H01G 4/06 |
| 2020/0258690 A1* | 8/2020 | Tsunoda | H01G 4/224 |

FOREIGN PATENT DOCUMENTS

| | | |
|---|---|---|
| JP | H10-93041 A | 4/1998 |
| JP | 2002-222925 A | 8/2002 |
| JP | 2004-214589 A | 7/2004 |
| JP | 2007-81325 A | 3/2007 |
| JP | 2007-299849 A | 11/2007 |
| JP | 2008-85083 A | 4/2008 |
| JP | 2008-277520 A | 11/2008 |
| JP | 2009-194096 A | 8/2009 |
| JP | 2010-225849 A | 10/2010 |
| JP | 2011-40571 A | 2/2011 |
| JP | 2011-77343 A | 4/2011 |
| JP | 2014-90077 A | 5/2014 |
| JP | 2016-167619 A | 9/2016 |

* cited by examiner (a)

(b)

(c)

(d)

THIN-FILM CAPACITOR

TECHNICAL FIELD

The present disclosure relates to a thin-film capacitor.

BACKGROUND ART

For example, Patent Literature 1 discloses a capacitor-incorporated substrate having a chip capacitor and electrode terminals drawn out from the chip capacitor and provided on both main surfaces.

CITATION LIST

Patent Literature

Patent Literature 1: Japanese Unexamined Patent Publication No. 2009-194096
Patent Literature 2: Japanese Unexamined Patent Publication No. 2007-81325

SUMMARY OF INVENTION

Technical Problem

In the capacitor-incorporated substrate, since the length of a circuit wiring is large, it is difficult to achieve a decrease in ESL. Therefore, thin-film capacitors in which a configuration of a capacitor-incorporated substrate is implemented using a thin film processing technique (that is, a thin-film capacitor which includes a capacitor structure therein and in which electrode terminals drawn out from the capacitor structure are provided on both main surfaces) have been developed.

The inventors have studied thin-film capacitors and found a technique capable of achieving a decrease in ESL of a thin-film capacitor.

Some aspects of the present disclosure provide a thin-film capacitor with low-ESL is achieved.

Solution to Problem

According to an aspect of the present disclosure, there is provided a thin-film capacitor including: an electrode terminal layer disposed on one surface side of the thin-film capacitor and including a connection area electrically connected to the external; a capacitor portion partially formed on a side of the electrode terminal layer opposite to the one surface side and having a stacked structure, an electrode layer and a dielectric layer are alternately stacked in the stacked structure; an insulating layer covering a formation area and a non-formation area from the side of the electrode terminal layer opposite to the one surface side, the capacitor portion is formed in the formation area, the capacitor portion is not formed in the non-formation area; a plurality of electrode terminals provided on the insulating layer; and a plurality of via conductors formed to penetrate the insulating layer in a stacking direction of the capacitor portion and connecting each of the plurality of electrode terminals to one of the electrode terminal layer and the electrode layer of the capacitor portion.

In the thin-film capacitor, since the via conductors formed to penetrate the insulating layer connect the electrode terminal layer and the electrode layer of the capacitor portion to the electrode terminals respectively, both a decrease in length of a circuit wiring and an increase in the number of terminals are achieved, and thus a thin-film capacitor with low-ESL is achieved.

In the thin-film capacitor according to another aspect of the present disclosure, the electrode terminal layer includes a plurality of connection areas to be connected to the external and a penetrating portion penetrating the electrode terminal layer between the adjacent connection areas to divide the adjacent connection areas. In this case, a part and the rest of a plurality of connection areas can be used as electrode terminals having different polarities.

In the thin-film capacitor according to another aspect of the present disclosure, a thickness of the insulating layer is larger than a thickness of the capacitor portion and 4 a thickness of the electrode terminal layer is larger than a thickness of the capacitor portion.

According to another aspect of the present disclosure, there is provided a thin-film capacitor capable of having an electronic component mounted on the thin-film capacitor and is to be disposed on a wiring board supplying electric power to the electronic component, wherein the plurality of electrode terminals are connected to the electronic component mounted on the thin-film capacitor and the electrode terminal layer is connected to the wiring board.

Advantageous Effects of Invention

According to the aspect of the present disclosure, a thin-film capacitor with low-ESL is provided.

DESCRIPTION OF EMBODIMENTS

Figure 1:
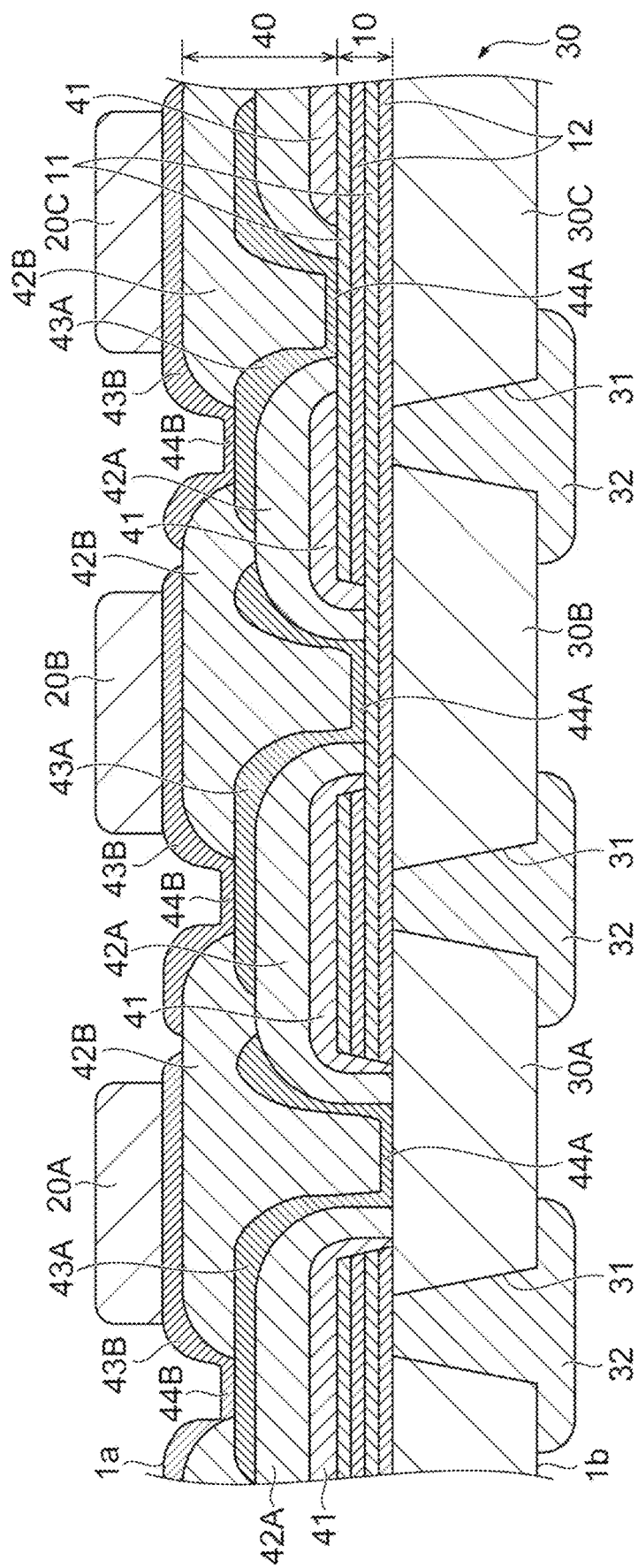
FIG. 1 is a sectional view schematically illustrating a part of a thin-film capacitor according to an embodiment of the present disclosure.

Hereinafter, various embodiments of the present disclosure will be described in detail with reference to the accompanying drawings. In the drawings, the same or corresponding elements will be referred to by the same reference signs and description thereof will not be repeated.

As illustrated in FIG. 1, a thin-film capacitor 1 according to an embodiment includes a capacitor portion 10 as a capacitor structure therein and includes electrode terminals 20A to 20C and electrode terminals 30A to 30C as electrode terminals drawn out from the capacitor portion 10 on both main surfaces thereof.

The electrode terminals 20A to 20C which are provided on one main surface 1*a* of the thin-film capacitor 1 are electrode terminals for connection to an electronic component (not illustrated) which is mounted on the thin-film capacitor 1. An electronic component can be mounted on the main surface on which the electrode terminals 20A to 20C are provided (hereinafter also referred to as an electronic component mounting surface).

The electrode terminals 30A to 30C provided on the other main surface 1*b* of the thin-film capacitor 1 are electrode terminals for connection to a wiring board (not illustrated)

which supplies electric power to the electronic component mounted on the thin-film capacitor 1 via the thin-film capacitor. The thin-film capacitor 1 can be mounted on a wiring board in a state in which the main surface on which the electrode terminals 30A to 30C are provided (hereinafter also referred to as a wiring board mounting surface) 1b faces the wiring board.

More specifically, the thin-film capacitor 1 includes an electrode terminal layer 30 that is disposed on the wiring board mounting surface 1b side and includes a plurality of connection areas which are electrically connected to a wiring board, a capacitor portion 10 that is partially formed on the side of the electrode terminal layer 30 opposite to the wiring plate side and has a stacked structure in which an electrode layer 11 and a dielectric layer 12 are alternately stacked, an insulating layer 40 that covers a formation area in which the capacitor portion 10 is formed and a non-formation area in which the capacitor portion 10 is not formed from the side of the electrode terminal layer 30 opposite to the wiring board side, a plurality of electrode terminals 20A to 20C that are formed on the insulating layer 40 and are to be connected to an electronic component, and a plurality of via conductors 43A and 43B that are formed to penetrate the insulating layer in the stacking direction of the capacitor portion 10 and connect the plurality of electrode terminals 20A to 20C to one of the electrode terminal layer 30 and the electrode layer 11 of the capacitor portion 10.

The plurality of connection areas of the electrode terminal layer 30 include a penetrating portion 31 that penetrates the electrode terminal layer 30 between adjacent connection areas to partition the connection areas, and the connection areas which are partitioned by the penetrating portion 31 serve as the electrode terminals 30A to 30C. Each penetrating portion 31 is filled with an insulating resin 32 having a thickness larger than the thickness of the electrode terminal layer 30 and thus realizes high electrical insulation between the electrode terminals 30A to 30C.

The electrode terminal layer 30 is formed of a material having conductivity. Specifically, an alloy including nickel (Ni) or platinum (Pt) as a major component can be used as the conductive material of the electrode terminal layer 30 and particularly an alloy including Ni as a major component may be used. The purity of Ni in the electrode terminal layer 30 may be high and may be, for example, equal to or greater than 99.99 wt %. Traces of impurities may be included in the electrode terminal layer 30. Examples of the impurities which can be included in the electrode terminal layer 30 formed of an alloy including Ni as a major component include transition metal elements or rare earth elements such as iron (Fe), titanium (Ti), copper (Cu), aluminum (Al), magnesium (Mg), manganese (Mn), silicon (Si), chromium (Cr), vanadium (V), zinc (Zn), niobium (Nb), tantalum (Ta), yttrium (Y), lanthanum (La), and cesium (Ce), chlorine (Cl), sulfur (S), and phosphorus (P). When the impurities diffuse from the electrode terminal layer 30 into the dielectric film at the time of manufacturing a thin-film capacitor, there is likelihood that a performance deterioration such as a decrease in insulation resistance of the dielectric layer 12 will be caused.

The thickness of the electrode terminal layer 30 may range from 10 nm to 100 µm, may range from 1 µm to 70 µm, or may range from about 10 µm to 30 µm. When the thickness of the electrode terminal layer 30 is excessively small, there is a tendency for handling the electrode terminal layer 30 at the time of manufacturing the thin-film capacitor 1 to be difficult. When the thickness of the electrode terminal layer 30 is excessively large, there is a tendency for an effect of suppressing a leak current to decrease. The area of the electrode terminal layer 30 is, for example, about 1×0.5 mm$^2$. The electrode terminal layer 30 may be formed of a metal foil and may be used as both a substrate and an electrode. In this way, the electrode terminal layer 30 in this embodiment can also be used as a substrate, but a substrate/electrode film structure in which the electrode terminal layer 30 is provided on a substrate formed of Si, alumina, or the like may be employed.

The capacitor portion 10 includes two electrode layers 11 and two dielectric layers 12 which are alternately stacked on the electrode terminal layer 30.

The electrode layers 11 are formed of a material having conductivity. Specifically, a material including nickel (Ni) or platinum (Pt) as a major component can be used for the electrode layers 11 and particularly Ni can be used. When the material including Ni as a major component is used for the electrode layers 11, the content thereof may be equal to or greater than 50 mol % with respect to the whole electrode layers 11. When a major component of the electrode layers 11 is Ni, at least one (hereinafter referred to as an "additive element") selected from the group consisting of platinum (Pt), palladium (Pd), iridium (Ir), rhodium (Rh), ruthenium (Ru), osmium (Os), rhenium (Re), tungsten (W), chromium (Cr), tantalum (Ta), and silver (Ag) is additionally added. Since the electrode layers 11 include the additive element, breakage of the electrode layers 11 is prevented. The electrode layers 11 may include a plurality of additive elements. The thicknesses of the electrode layers 11 range, for example, from about 10 nm to 1000 nm.

The dielectric layers 12 are formed of a (ferroelectric) dielectric material having a perovskite structure such as BaTiO$_3$ (barium titanate), (Ba$_{1-X}$Sr$_X$)TiO$_3$ (barium strontium titanate), (Ba$_{1-X}$Ca$_X$)TiO$_3$, PbTiO$_3$, or Pb(Zr$_X$Ti$_{1-X}$)O$_3$, a complex perovskite relaxer type ferroelectric material such as Pb(Mg$_{1/3}$Nb$_{2/3}$)O$_3$, a bismuth-layered compound such as Bi$_4$Ti$_3$O$_{12}$ or SrBi$_2$Ta$_2$O$_9$, a tungsten-bronze type ferroelectric material such as (Sr$_{1-X}$Ba$_X$)Nb$_2$O$_6$ or PbNb$_2$O$_6$, or the like. Here, in the perovskite structure, the perovskite relaxer type ferroelectric material, the bismuth-layered compound, and the tungsten-bronze type ferroelectric material, a ratio of A site and B site is normally an integer ratio, but may be intentionally deviated from the integer ratio for the purpose of improvement in characteristics. In order to control characteristics of the dielectric layers 12, additives may be appropriately added as secondary components to the dielectric layers 12. The thicknesses range of the dielectric layers 12, for example, from 10 nm to 1000 nm.

The insulating layer 40 covers a formation area in which the capacitor portion 10 is formed and a non-formation area in which the capacitor portion 10 is not formed and includes a passivation layer 41, a first insulating layer 42A, and a second insulating layer 42B.

The passivation layer 41 directly covers the capacitor portions 10 and is formed of an inorganic insulating material (for example, SiO$_2$).

The first insulating layer 42A covers the capacitor portion 10 in each area (each formation area) in which the capacitor portion 10 is formed in the electrode terminal layer 30. The second insulating layer 42B covers an area in which the first insulating layer 42A is not formed, that is, an area (a non-formation area) in which the capacitor portion 10 is not formed, and partially covers the first insulating layer 42A at a circumferential edge of the non-formation area. That is, the electrode terminal layer 30 is covered by a two-stage structure including the first insulating layer 42A and the second insulating layer 42B.

The material of the first insulating layer 42A and the second insulating layer 42B is not particularly limited as long as it is an insulating material and, for example, a non-conductive resin such as a polyimide, an inorganic material such as $SiO_2$, alumina, or SiN (silicon nitride), or an insulating material in which they are mixed or stacked can be used. The thickness of the first insulating layer 42A (a distance between the top surface of the passivation layer 41 and the top surface of the first insulating layer 42A) ranges, for example, from 0.5 µm to 10 µm, and the thickness of the second insulating layer 42B (a distance between the top surface of the first insulating layer 42A and the top surface of the second insulating layer 42B) ranges, for example, from 0.5 µm to 10 µm.

Between the first insulating layer 42A and the second insulating layer 42B, a first wiring portion 43A is formed along the top surface of the first insulating layer 42A. The first wiring portion 43A extends vertically along the top surface of the first insulating layer 42A and includes a contact portion 44A that comes into contact with the electrode terminal layer 30 or the electrode layers 11 at the bottom end thereof. A second wiring portion 43B is formed on the second insulating layer 42B along the top surface of the second insulating layer 42B. The second wiring portion 43B extends vertically along the second insulating layer 42B and includes a contact portion 44B that comes into contact with the first wiring portion 43A at the bottom end thereof. The electrode terminals 20A to 20C are formed on the second wiring portion 43B.

The contact portion 44B of the second wiring portion 43B on which the electrode terminal 20A is formed comes into contact with the first wiring portion 43A including the contact portion 44A which is in contact with the electrode terminal layer 30. The contact portion 44B of the second wiring portion 43B on which the electrode terminal 20B is formed comes into contact with the first wiring portion 43A including the contact portion 44A which is in contact with the lower electrode layer 11 of the capacitor portion 10. The contact portion 44B of the second wiring portion 43B on which the electrode terminal 20C is formed comes into contact with the first wiring portion 43A including the contact portion 44A which is in contact with the upper electrode layer 11 of the capacitor portion 10.

The first wiring portion 43A and the second wiring portion 43B serve as via conductors that are formed to penetrate the insulating layer 40 and connect each of the electrode terminals 20A to 20C to one of the electrode terminal layer 30 and the electrode layer 11 of the capacitor portion 10. The first wiring portion 43A and the second wiring portion 43B are formed of, for example, a conductive material such as copper (Cu). The electrode terminals 20A to 20C which are electrically connected to the second wiring portion 43B are formed of, for example, a conductive material such as copper (Cu).

Figure 2:
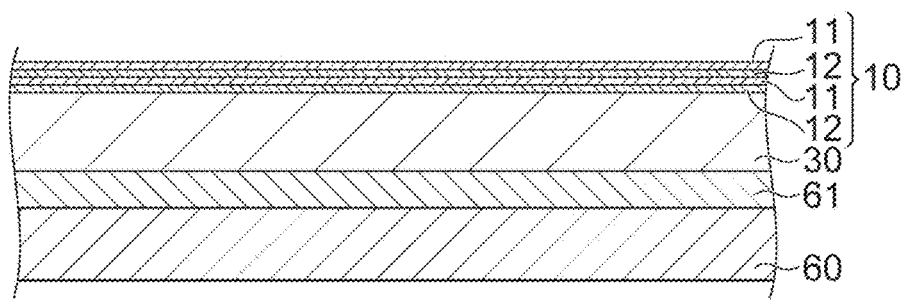
FIGS. 2(*a*) to 2(*e*) are diagrams illustrating a method of manufacturing the thin-film capacitor illustrated in FIG. 1.
Figure 2:
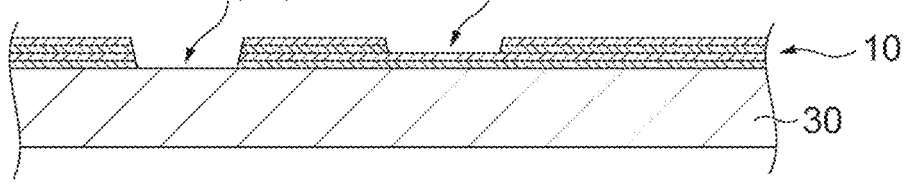
Figure 2:
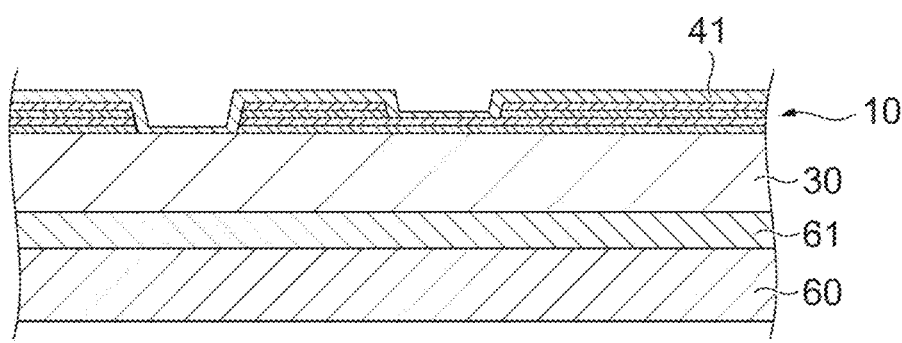
Figure 2:
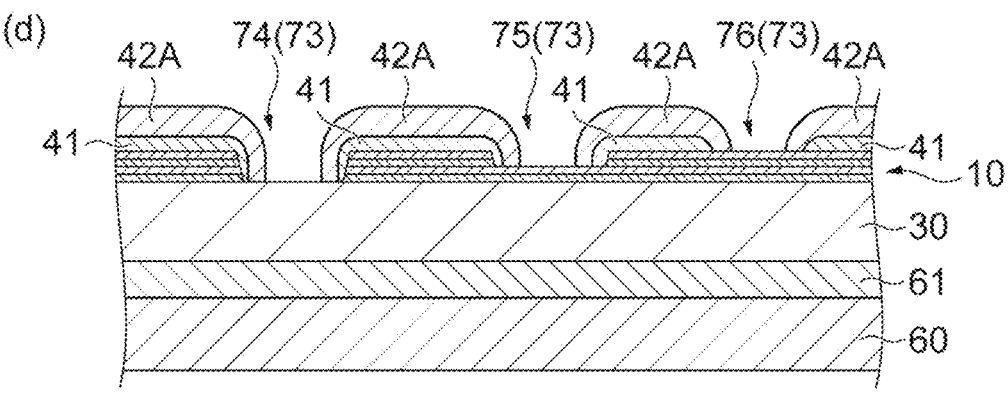
Figure 2:
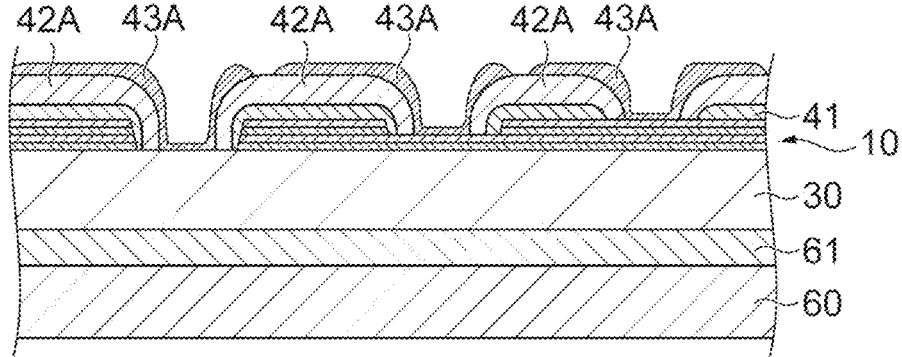
Figure 3:
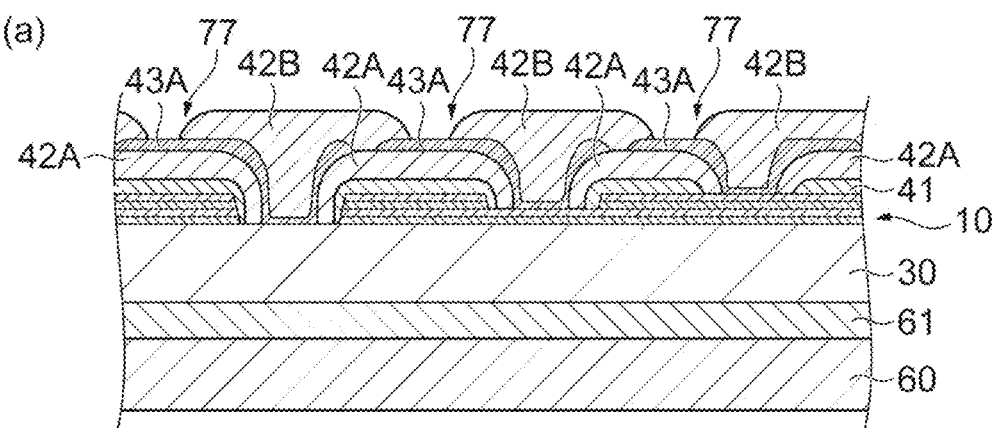
FIGS. 3(*a*) to 3(*d*) are diagrams illustrating a method of manufacturing the thin-film capacitor illustrated in FIG. 1.
Figure 3:
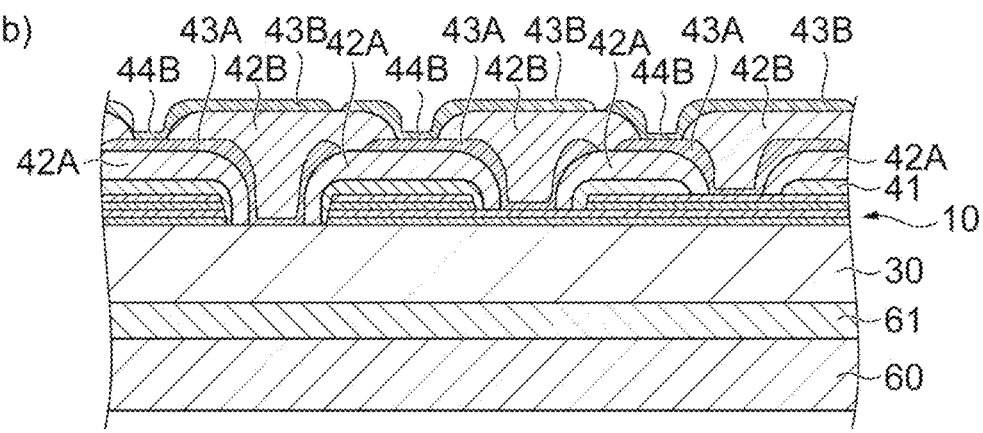
Figure 3:
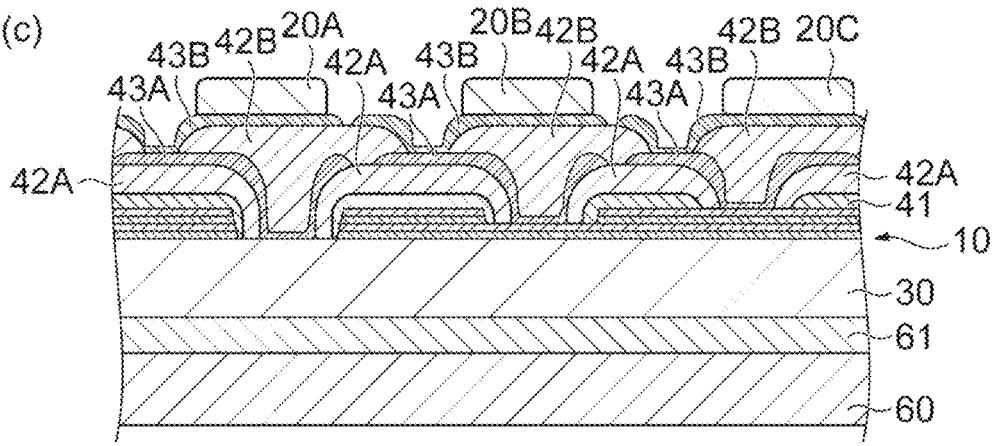
Figure 3:
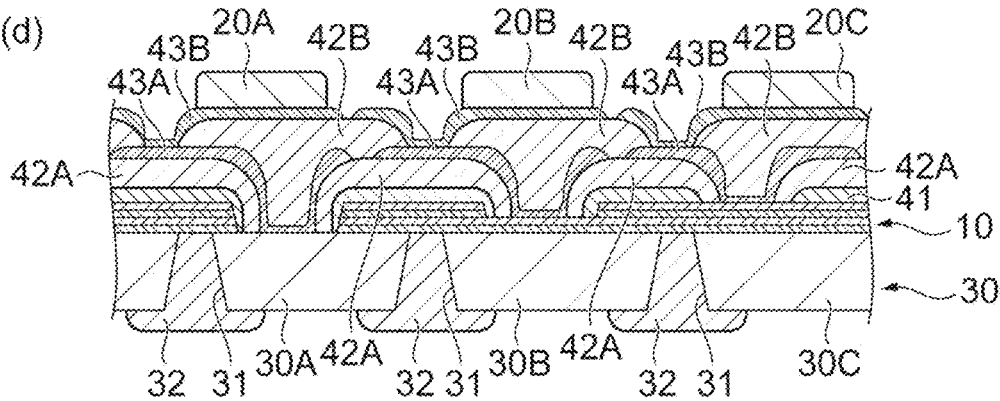

A method of manufacturing the thin-film capacitor 1 will be described below with reference to FIGS. 2 and 3. FIGS. 2 and 3 are enlarged views of a part of the thin-film capacitor 1 during manufacture of the thin-film capacitor. Actually, a plurality of thin-film capacitors 1 are formed together and then are diced into individual thin-film capacitors 1.

First, as illustrated in FIG. 2(a), a metal foil which becomes the electrode terminal layer 30 and which is supported by a support material 60 with a temporary pasting material 61 interposed therebetween is prepared, and the dielectric layer 12 and the electrode layer 11 which become the capacitor portion 10 are alternately formed on the electrode terminal layer 30. The metal foil which becomes the electrode terminal layer 30 is polished such that the surface thereof has predetermined arithmetic mean roughness Ra if necessary. This polishing can be performed using a method such as a chemical mechanical polishing (CMP) method, an electrolytic polishing method, or a buffing method. An example of the method of forming the electrode layer 11 is a DC sputtering method. As the method of forming the dielectric layer 12, a film formation technique of a physical vapor deposition method (PVD) method or a chemical vapor deposition (CVD) method such as a solution method or a sputtering method can be used.

Then, as illustrated in FIG. 2(b), a predetermined opening 70 penetrating the electrode layers 11 and the dielectric layers 12 is formed. For example, formation of the opening 70 is performed by dry etching using a patterned resist as a mask. Through this process, two openings 71 and 72 are formed in the electrode layers 11 and the dielectric layers 12. In the opening 71, the electrode terminal layer 30 is exposed from the bottom surface and a continuous side surface including the electrode layers 11 and the dielectric layers 12 is formed in the capacitor portion 10. In the opening 72, the lower electrode layer 11 is exposed from the bottom surface and a continuous side surface including the electrode layers 11 and the dielectric layers 12 is formed in the capacitor portion 10.

Thereafter, the support material 60 is removed along with the temporary pasting material 61 and a stacked body in which the electrode layers 11 and the dielectric layers 12 are stacked on the electrode terminal layer 30 is baked. The baking temperature can be set to a temperature at which the dielectric layer is sintered (crystallized) and can be specifically set to range from 500° C. to 1000° C. The baking time can be set to range from about 5 minutes to 2 hours. The baking atmosphere is not particularly limited and may be one of an oxidizing atmosphere, a reducing atmosphere, and a neutral atmosphere. The baking can be performed at least under an oxygen partial pressure at which the electrode layer 11 is not oxidized. The baking time is not limited to this time and, for example, the baking may be performed before the opening 70 is formed or may be performed after the opening 70 is formed.

Then, as illustrated in FIG. 2(c), a support material 60 is attached to the electrode terminal layer 30 with a temporary pasting material 61 interposed therebetween again, and an inorganic insulating layer (for example, a $SiO_2$ layer) which becomes the passivation layer 41 is formed in a state in which the electrode terminal layer 30 is supported by the support material 60.

Subsequently, as illustrated in FIG. 2(d), the first insulating layer 42A is formed on the electrode layers 11 and the dielectric layers 12. The first insulating layer 42A is formed, for example, by applying an uncured thermosetting resin and heating and curing the thermosetting resin. The first insulating layer 42A may be formed by applying an uncured photo-curing resin and irradiating the photo-curing resin with light of a specific wavelength to cure the photo-curing resin. After the insulating material constituting the first insulating layer 42A has been cured, a predetermined opening 73 for forming the first wiring portion 43A is formed by dry etching or the like. In this embodiment, three openings 74, 75, and 76 are formed as the opening 73. The opening 74 is formed in the vicinity of the center of the opening 71 such that the first insulating layer 42A in the opening 71 is penetrated. The opening 75 is formed in the vicinity of the center of the opening 72 such that the first insulating layer 42A in the opening 72 is penetrated. The opening 76 is formed to penetrate the first insulating layer 42A in a predetermined area. Through this process, the electrode terminal layer 30 is exposed from the bottom surface of the opening 74, the lower electrode layer 11 is exposed from the bottom surface of the opening 75, and the upper electrode layer 11 is exposed from the bottom surface of the opening 76. The electrode layers 11 and the dielectric layers 12 are sealed by the first insulating layer 42A.

Then, as illustrated in FIG. 2(e), the first wiring portion 43A is formed inside the opening 73 of the first insulating layer 42A and on the first insulating layer 42A at the opening edge. The first wiring portion 43A is formed, for example, by sputtering or depositing a conductive material such as a copper (Cu) and then performing patterning by etching. Through this process, a plurality of first wiring portions 43A which are electrically isolated from each other are formed. At this time, the first wiring portion 43A formed around the opening 74 is electrically connected to the electrode terminal layer 30, the first wiring portion 43A formed around the opening 75 is electrically connected to the lower electrode layer 11, and the first wiring portion 43A formed around the opening 76 is electrically connected to the upper electrode layer 11.

Then, as illustrated in FIG. 3(a), the second insulating layer 42B is formed on the first insulating layer 42A and the first wiring portion 43A. Similarly to the first insulating layer 42A, the second insulating layer 42B is formed, for example, by applying an uncured thermosetting resin and then heating and curing the thermosetting resin. After an insulating material constituting the second insulating layer 42B has been cured, three openings 77 for forming the second wiring portion 43B are formed by dry etching or the like. Through this process, the first wiring portion 43A is exposed from the openings 77.

Then, as illustrated in FIG. 3(b), the second wiring portion 43B is formed inside the openings 77 of the second insulating layer 42B and on the second insulating layer 42B at the circumferential edges of the openings. Similarly to the first wiring portion 43A, the second wiring portion 43B is formed, for example, by sputtering or depositing a conductive material such as copper (Cu) and then patterning the conductive material by etching. Through this process, a plurality of second wiring portions 43B which are electrically isolated from each other are formed. At this time, the second wiring portions 43B formed around the openings 77 are electrically connected to the first wiring portions 43A.

Then, as illustrated in FIG. 3(c), the electrode terminals 20A to 20C for electrically connecting the thin-film capacitor 1 to an external electronic component are formed on the second wiring portions 43. The electrode terminals 20A to 20C are formed, for example, by forming a layer of a conductive material such as copper (Cu) by plating or the like and then performing etching or the like.

Finally, as illustrated in FIG. 3(d), the support material 60 along with the temporary pasting material 61 is removed. Then, penetrating portions 31 are formed in the electrode terminal layer 30 to partition the electrode terminal layer 30 into the electrode terminals 30A and 30B. The penetrating portions 31 are formed, for example, using a wet etching method. The penetrating portions 31 are filled with an insulating resin 32. The filling with the insulating resin 32 is performed, for example, using a laminating method. Thereafter, by performing fragmentation by dicing or the like, the thin-film capacitor 1 illustrated in FIG. 1 is obtained.

In the thin-film capacitor 1, the electrode terminal layer 30 and the electrode layers 11 of the capacitor portion 10 are connected to the electrode terminals 20A to 20C by via conductors (that is, the first wiring portions 43A and the second wiring portions 43B) formed to penetrate the insulating layer 40 in the stacking direction of the capacitor portion 10. When a wiring creeps about in a plane perpendicular to the thickness direction of the thin-film capacitor, a detour of a circuit wire or the like occurs and the wiring is lengthened, but a short circuit wiring in the thickness direction is realized by the via conductors 43A and 43B in the thin-film capacitor 1. That is, in the thin-film capacitor 1, it is possible to achieve an increase in the number of terminals in the plurality of electrode terminals 20A to 20C and a decrease in length of the circuit wiring and thus to obtain a thin-film capacitor with low-ESL has been achieved.

In the thin-film capacitor 1, rewiring is performed by employing a two-stage configuration of the first insulating layer 42A and the second insulating layer 42B. That is, the position of the first wiring portion 43A is restricted to a position just above the capacitor portion 10 or the vicinity thereof, but the position of the second wiring portion 43B is not limited to the position and can be freely determined. Accordingly, it is possible to enhance a degree of freedom in design of positions of the electrode terminals 20A to 20C which are formed on the second wiring portion 43B. A plurality of second wiring portions 43B can be drawn out from one first wiring portion 43A. In this case, it is possible to easily achieve an increase in the number of terminals of the electrode terminals 20A to 20C.

In the thin-film capacitor 1, the thickness of the insulating layer 40 is larger than the thickness of the capacitor portion 10. In this way, when the thickness of the insulating layer 40 is large, ESL is likely to increase, but it is possible to achieve an effective decrease in ESL due to the decrease in length of the circuit wiring using the via conductors 43A and 43B. The thickness of the electrode terminal layer 30 is larger than the thickness of the capacitor portion 10.

Figure 4:
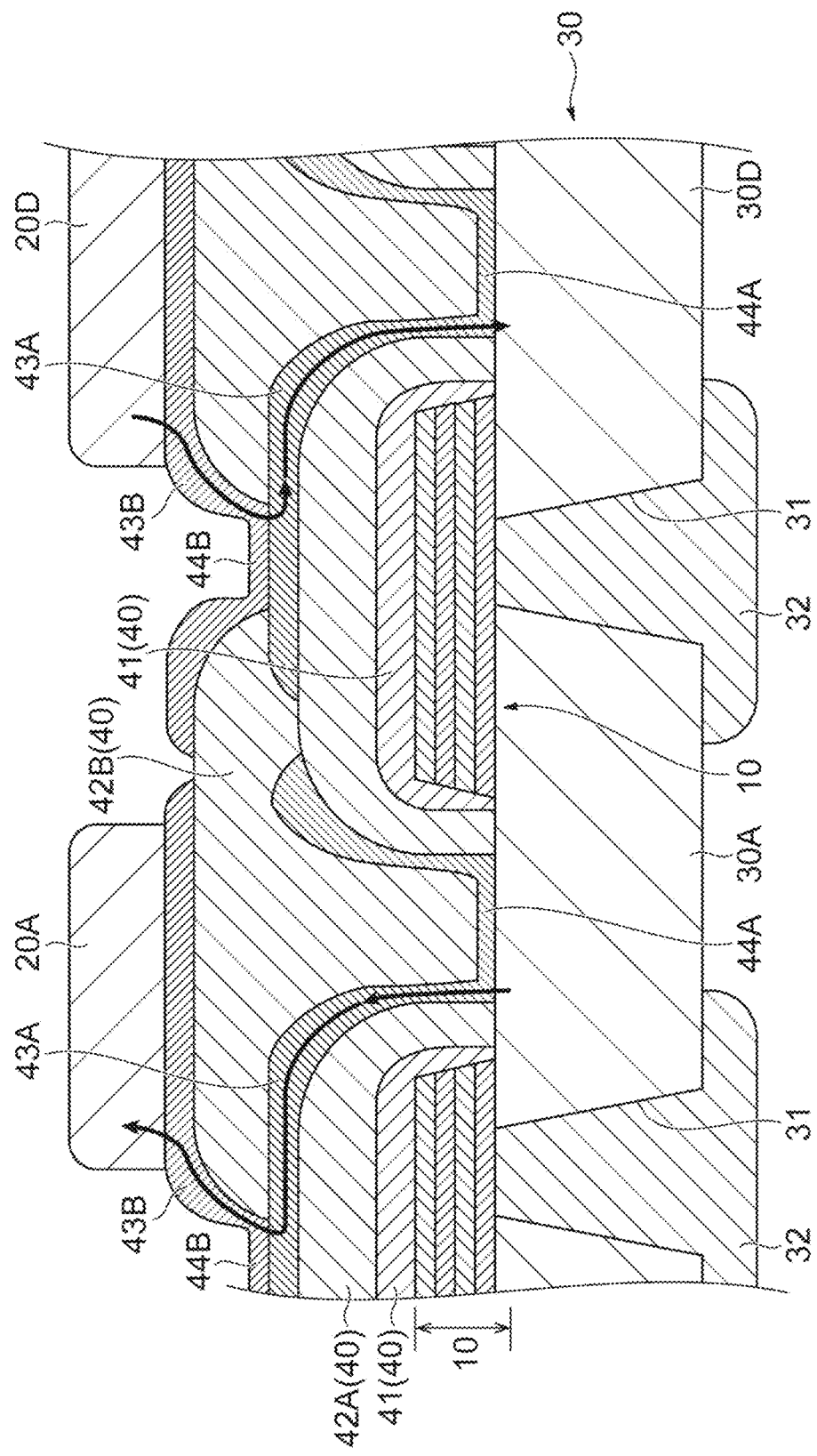
FIG. 4 is a sectional view schematically illustrating a part of a thin-film capacitor according to another aspect which is different from that illustrated in FIG. 1.

The thin-film capacitor 1 includes the electrode terminals 30A to 30C which are partitioned by the penetrating portions 31. Accordingly, the electrode terminals 30A to 30B can be used to have desired polarities. For example, when the thin-film capacitor 1 includes two electrode terminals 30A and 30D which are partitioned by a penetrating portion 31 as illustrated in FIG. 4, currents in opposite directions may be caused to flow in via conductors 43A and 43B interposed between the electrode terminals 30A and 30D and electrode terminals 20A and 20D as indicated by an arrow in FIG. 4 by setting the polarities of the electrode terminals 30A and 30D to be different from each other. In this case, it is possible to achieve a decrease in length of circuit wirings in the thickness direction in both the positive electrode and the negative electrode, to easily achieve an increase in the number of terminals in both the positive electrode and the negative electrode, and thus to further achieve a decrease in ESL.

The thin-film capacitor is not limited to the above-mentioned embodiment and can be modified in various forms.

For example, a via conductor is not limited to the configuration of the above-mentioned via conductors 43A and 43B, and a via conductor having a configuration in which a through-hole extending straightly in the thickness direction of the insulating layer is filled with a conductor may be employed. In the thin-film capacitor, the insulating layer is configured to have a two-stage configuration for rewiring, but a multi-stage configuration of three or more stages may be employed or a single-stage configuration may be employed. In the capacitor portion, the number of layers of the electrode layers and the dielectric layers can be appropriately increased or decreased.

REFERENCE SIGNS LIST

1 Thin-film capacitor
10 Capacitor portion
11 Electrode layer
12 Dielectric layer
20A to 20D Electrode terminal
30 Electrode terminal layer
30A to 30D Electrode terminal
40 Insulating layer
43A First wiring portion
43B Second wiring portion

The invention claimed is:

1. A thin-film capacitor comprising:
a first electrode terminal disposed on one surface side of the thin-film capacitor and including a connection area configured for external electrical connection;
a capacitor portion partially formed on a side of the first electrode terminal opposite to the one surface side and having a stacked structure in which an electrode layer and a dielectric layer are stacked in the stacked structure;
an insulating layer covering a formation area and a non-formation area from the side of the first electrode terminal opposite to the one surface side, the capacitor portion being formed in the formation area, the capacitor portion not being formed in the non-formation area;
a plurality of second electrode terminals provided on the insulating layer; and
a plurality of via conductors formed to penetrate the insulating layer in a stacking direction of the capacitor portion and connecting each of the plurality of second electrode terminals to one of the first electrode terminal and the electrode layer of the capacitor portion,
wherein a thickness of the first electrode terminal is larger than a thickness of the capacitor portion.

2. The thin-film capacitor according to claim 1, wherein the first electrode terminal includes a plurality of connection areas to be externally connected and a penetrating portion penetrating the first electrode terminal between adjacent connection areas to divide the adjacent connection areas.

3. The thin-film capacitor according to claim 1, wherein a thickness of the insulating layer is larger than a thickness of the capacitor portion.

4. The thin-film capacitor according to claim 1, wherein the thin-film capacitor is capable of having an electronic component mounted on the thin-film capacitor and is to be disposed on a wiring board supplying electric power to the electronic component,
wherein the plurality of second electrode terminals are connected to the electronic component mounted on the thin-film capacitor, and
wherein the first electrode terminal is connected to the wiring board.

5. The thin-film capacitor according to claim 1, wherein the insulating layer includes a first insulating layer covering the formation area and a second insulating layer covering the non-formation area, and
wherein each via conductor includes a first wiring portion formed along a surface of the first insulating layer and coming into contact with the first electrode terminal or the electrode layer of the capacitor portion, and a second wiring portion formed on the second insulating layer along a surface of the second insulating layer and coming into contact with the first wiring portion and respective second electrode terminals.

* * * * *